Sept. 18, 1934.  S. RICHARDS  1,973,877
METHOD AND APPARATUS FOR REMOVING BURRS FROM WELDED MATERIAL
Filed Aug. 5, 1930  4 Sheets-Sheet 1
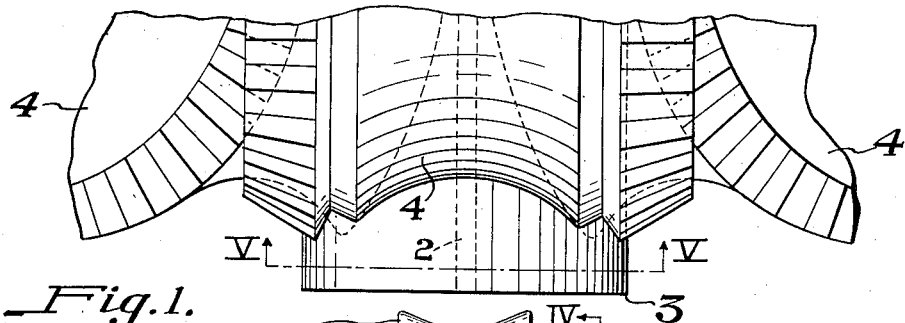
Fig. 1.
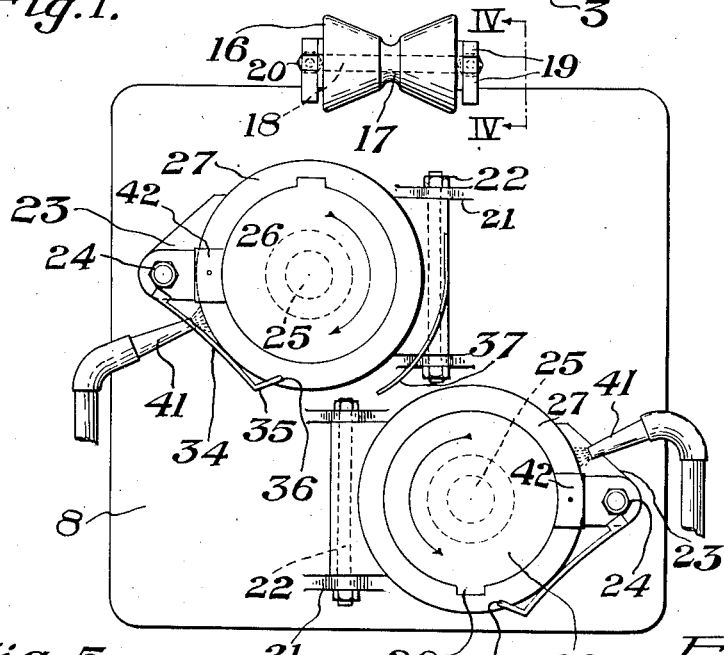
Fig. 5.
Fig. 7.
Fig. 6.
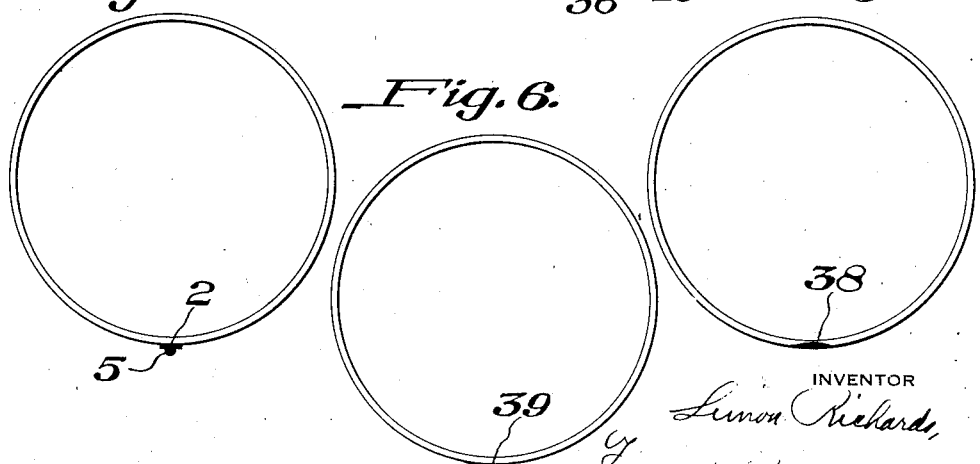
INVENTOR Sept. 18, 1934.   S. RICHARDS   1,973,877
METHOD AND APPARATUS FOR REMOVING BURRS FROM WELDED MATERIAL
Filed Aug. 5, 1930   4 Sheets-Sheet 2

INVENTOR
Simon Richards,

Sept. 18, 1934.   S. RICHARDS   1,973,877
METHOD AND APPARATUS FOR REMOVING BURRS FROM WELDED MATERIAL
Filed Aug. 5, 1930   4 Sheets-Sheet 3
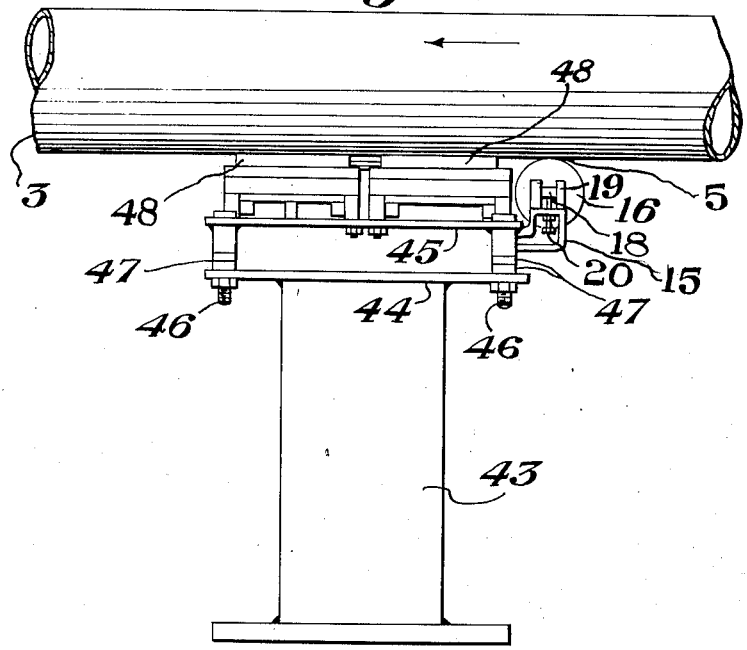
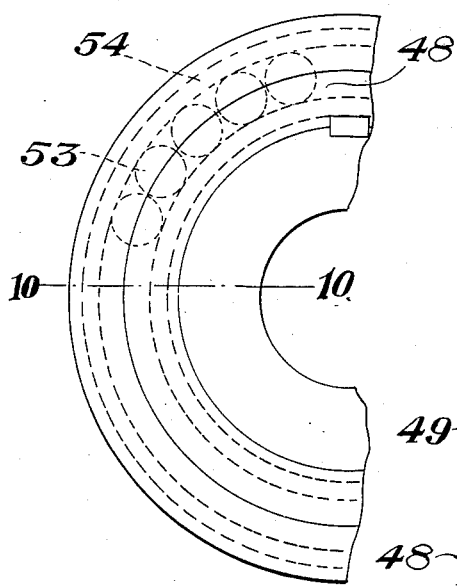
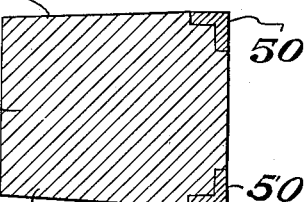

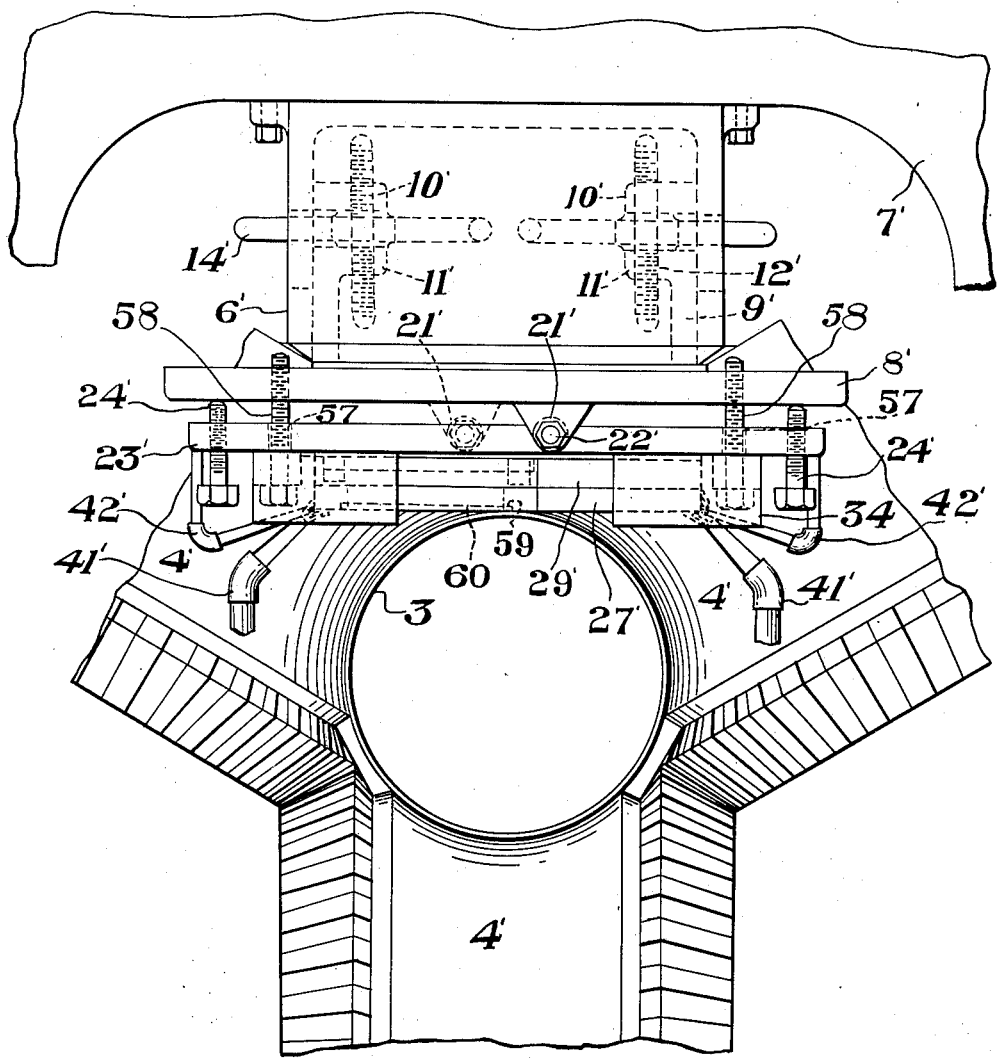

Patented Sept. 18, 1934

1,973,877

UNITED STATES PATENT OFFICE 1,973,877

METHOD AND APPARATUS FOR REMOVING BURRS FROM WELDED MATERIAL

Simon Richards, Youngstown, Ohio, assignor to The Youngstown Sheet & Tube Company, Youngstown, Ohio, a corporation of Ohio Application August 5, 1930, Serial No. 473,161

11 Claims. (Cl. 164—60)

In the art of producing welded articles, the welding operation together with pressure applied for insuring intimate engagement of the portions being welded, usually results in the formation of a projecting bead or burr along the line of weld. One of the objects of the present invention is to provide an improved method and apparatus particularly adapted for the complete or partial removal of such a burr.

Another object of the present invention is to provide a method and apparatus for removing burrs which, in case of partial burr removal, may be utilized for imparting a predetermined shape to the portion of the burr which is permitted to remain on the article.

The utility of the invention is not in any wise limited to the particular construction and operation of the welding apparatus by means of which the weld itself is obtained. I have found, however, that certain desirable results are obtained where the burr removing operation is carried on preferably simultaneously with the movement of the material by means of which the weld is produced. To this end, it is preferable wherever the conditions in the mill permit of such a construction, to place the burr removing mechanism in closely adjacent relationship to the welding apparatus.

In the accompanying drawings I have illustrated somewhat diagrammatically a preferred embodiment of the invention. In the drawings:

Figure 1 is a top plan view illustrating a portion of a welding apparatus shown diagrammatically with my improved burr removing mechanism in cooperative relation thereto;

Figure 5 is a transverse sectional view along the line V—V of Figure 1, illustrating a representative weld as produced by the welding apparatus;

Figure 6 is a view similar to Figure 5 illustrating the material after it has been subjected to one type of burr removing operation;

Figure 7 is a view similar to Figure 6 illustrating the material after it has been subjected to another type of burr removing operation effective for substantially completely removing the burr;

Figure 8 is a view similar to Figure 2 illustrating a slightly modified embodiment of my invention;

Figure 9 is a top plan view of a portion of a slightly modified form of shear;

Figure 10 is a transverse sectional view of the device of Figure 9;

Figure 11 is a detail sectional view, on an enlarged scale, of the shear shown in Figures 9 and 10; and Figure 12 is a view similar to Figure 2 illustrating still another embodiment of the invention.

Figure 2:
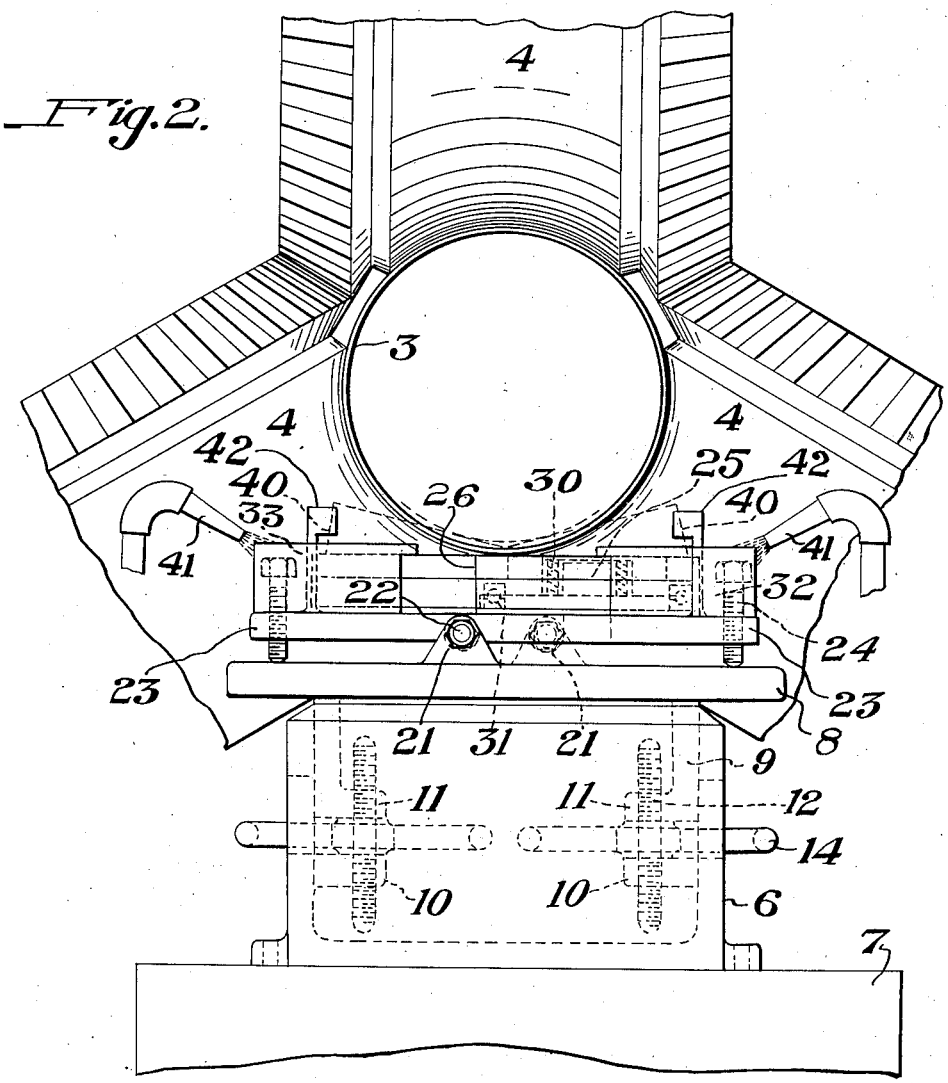
Figure 2 is an end elevational view of the apparatus illustrated in Figure 1.
Figure 3:
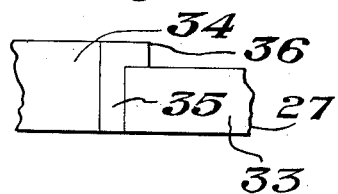
Figure 3 is a detail elevational view of one of the scrapers illustrated more particularly in Figure 1 of the drawings.

In the operation of welding, the application of the welding pressure is such as to force the portions being welded into engagement and to produce a partial flow of the metal outwardly in such manner as to form a projecting burr. Where the material is of tubular or substantially tubular cross sectional area adapted for the conveying of fluids, it is customary to so construct the welding apparatus as to prevent the formation of an inwardly projecting burr since such a burr tends to interfere with the desired movement of certain fluids for which such tubular material is utilized. It is therefore usually customary to partly confine the metal being welded particularly adjacent the weld itself so that the burr is entirely formed on one side or the other. Such a burr not only detracts from the appearance of the finished article, but since it contains most of the impurities, such as scale and the like, it frequently presents the appearance of a partial crack or fissure which makes it appear that the article contains an imperfect seam.

In addition to detracting from the appearance of the material, such a burr, by reason of its more or less ragged character, interferes with the proper handling thereof. Also, where the burr is composed in part of portions tending to lap over adjacent portions of the parent metal, pockets or crevices are formed in which there is a collection of such materials as tend to more rapidly corrode the metal.

For all of the foregoing reasons it is usually desirable to provide for the removal of at least a portion of such burr.

It has heretofore been attempted to effect the removal of such burr in a number of different ways. In accordance with one method, there has been utilized a substantially stationary cutting tool generally similar to a lathe cutting tool, and having a cutting point of special alloy steel, it having been found that ordinary tool steel, for example, will not stand up to such an operation. The amount of cutting, however, has necessarily been such as to generate a large amount of heat, requiring cooling of the cutting tool. When such cooling has been attempted it has resulted in cracking of the tool itself.

It has also been proposed to use refractory abrading and/or cutting means, but such means under the temperature conditions prevailing and under the amount of work which they have been called upon to perform, have required frequent replacement.

In accordance with the present invention I provide cutting means of comparatively large area not only giving a greater strength enabling the tools to be maintained in the desired operative relation to the material, but insuring a more rapid heat conduction from the cutting point with a consequent more rapid heat distribution and dissemination. Such a construction adapts itself to a water cooling operation.

Referring more particularly to the drawings, there is illustrated in Figure 1 the delivery end of a welding apparatus effective for producing a weld 2 between the meeting edges of substantially tubular material 3. The welding apparatus is illustrated as comprising opposed pressure rolls 4 preferably disposed around the material in such manner as to define a more or less complete pass through which the material is forced. The shape of the pass is such that the seam or weld 2 has projecting therefrom a burr 5 possessing the objectionable characteristics before set forth. In the illustrated embodiment of the invention the welding apparatus is shown as effective for the production of a so-called bottom weld, although it will be understood that the utility of the invention is not limited either with respect to the location of the weld itself or with respect to the apparatus by which it is produced.

Most forms of welding apparatus as utilized commercially are effective for concentrating the heating of the material to a more or less narrow zone adjacent the portions to be welded. With so-called induction welding apparatus such as heretofore proposed, such zones are extremely narrow. In most cases, however, the maximum heat may be considered as concentrated in the seam portion of the material, while the remaining portions thereof do not have their temperatures appreciably affected. Where the zone of highly heated metal is relatively small and the diameter of complete cross sectional area of the article relatively large, the temperature conditions may not be such as to produce any tendency toward cambering the article or twisting the seam. In other cases, however, where the area of heated metal is relatively larger as compared to the cross sectional area of the welded article, an objectionable cambering and seam twisting tendency may exist. In any case I have found that strains in the finished article, as well as the tendency towards cambering, seam twisting or the like, may be at least partially offset by effecting a removal of a portion of the heated material within a comparatively short period of time after the welding has been completed. Therefore, while my invention is useful for the removal of burr from welded articles at any temperature, I preferably make provision for burr removal before the burr has appreciably cooled.

In Figure 1 of the drawings, there is shown one form of burr removing mechanism in position closely adjacent the delivery end of the welding apparatus. This mechanism is illustrated as comprising a supporting frame 6 secured to a suitable foundation 7 and in turn shaped to cooperate with and support a shear table 8. In Figure 2 the frame 6 is shown as comprising a substantially hollow casting within which is slidably mounted a projection 9 on the lower side of the shear table. Adjacent each corner of the frame there is formed a lug 10 in alignment with a corresponding lug 11 on the table projection 9, these lugs being internally threaded to receive oppositely threaded portions of a screw 12 each provided with a hand wheel 14. By reason of this construction it will be apparent that the shear table as a whole may be adjusted vertically at the will of the operator.

Figure 4:
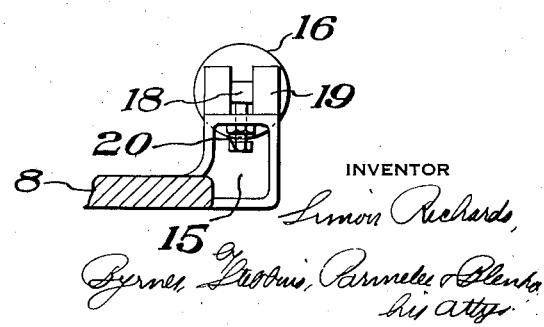
Figure 4 is a detail sectional view, on an enlarged scale, along the line IV—IV of Figure 1, looking in the direction of the arrows.

Secured to the portion of the table 8 adjacent the welding apparatus is a bracket 15 shaped to receive a material supporting and guiding roller 16 preferably comprising opposed tapering portions providing a groove 17 therebetween for the reception of the burr 5. More particularly from Figure 4 of the drawings it will be apparent that the roller 16 is carried by a shaft 18 the end portions of which are of angular cross section to cooperate with guiding bifurcations 19 on the upper side of the bracket 15. Cooperating with the angular end portions of the shaft are adjusting screws 20 by means of which the vertical position of the roller may be varied.

Projecting upwardly from the table, preferably in longitudinally offset relationship and on opposite sides of the center line thereof are bearings 21 each having a pivot pin 22 extending therethrough for pivotally mounting shear carriers 23. Each of the shear carriers has threaded in the free end thereof a set screw 24 by means of which the shear carriers may be individually angularly adjusted to different inclined positions about their pivotal mountings.

Projecting upwardly from each of the shear carriers is a stud 25 on which is rotatably mounted in any desirable manner a rotary shear 26. While the shears themselves may be of any desired construction, each shear preferably is in the form of an annular ring 27 keyed or otherwise secured as indicated at 28 to a disk 29 rotatable on the stud 25 through the medium of roller bearings 30. Each disk 29 is also preferably enlarged below the shear to cooperate with a thrust bearing 31, the peripheral portion 32 of the disk being extended to enclose the thrust bearing and thereby prevent the passage of foreign material thereto. This construction enables the shears themselves, which are herein shown as having peripheral faces 33 substantially normal to the side faces, to be removed and replaced at will.

Secured to each of the shear carriers 23 is a scraper 34 preferably of suitable spring material, and having inturned ends 35 adapted to bear against the periphery 33 of the shears. Each scraper also preferably comprises a projection 36 which partially overlies the shear with which it cooperates for keeping the upper portion thereof free from any accumulations. The resilient characteristics of the scrapers are such as to maintain them in scraping engagement with the shears at all times.

I have also illustrated one of the shear carriers 23 as provided with a curved guide 37 so disposed as to intersect the line of the burr being removed and thereby deflect the burr laterally out of the zone of operation of succeeding shear, whereby such succeeding shear is free to operate without interference, directly on the burr.

A shear mechanism possessing characteristics of the nature referred to is extremely flexible in operation inasmuch as the main shear table may be adjusted to any desired operating position, and the material supporting and guiding roller 16 likewise adjusted relative to the shear table. The cutting plane of each of the shears may also be varied with respect to the plane of the table so as to be effective either in a plane substantially parallel to the material where it is flat, tangent thereto where it is substantially tubular, or at an angle to the material. In Figure 2 of the drawings the former position is illustrated, which position is effective for producing a finished article having a welded portion 38 substantially flush at its surface with the adjacent surfaces of the parent metal. In Figure 6, however, there is illustrated an article having a welded portion 39 such as would be formed by an angular adjustment of the shears to the position indicated by dotted lines 40 in Figure 2. It will be apparent that this angularity may be made greater or less depending upon the characteristics which it is desired to obtain whereby the burr may be either completely removed or only partially removed in such manner as to leave a projecting portion of substantially triangular cross section.

Where the shearing operation is effected while the burr is still hot, not only do I obtain advantages of the character referred to, but I also facilitate the burr removal itself, since the heated metal lends itself to easier removal. Also, the heated metal of the burr is capable of an easier flowing operation under the action of the shears, such that any depressions, fissures or the like are more effectively filled in such manner that the finished article is less subject to the collection and retention of corroding substances.

From Figure 1 of the drawings it will be apparent that each of the shears is so mounted as to be effective completely across the burr, making it possible to effect a burr removal by the use of one shear only. I have found, however, that while the burr may be effectively removed in this manner, there is a tendency toward the production of a more or less ragged edge at the point of final severance between the burr and the article. The second shear prevents the formation of such an edge in cases where it is desired to effect complete burr removal, and also makes possible the production of a symmetrical projecting burr in cases where such a burr is desired. In some cases I have found that satisfactory results may be realized by maintaining the shears themselves at different angles, whereby one of the shears serves as a trimming means for the other shear.

While shearing mechanism of the character described may include rotary shears which are positively driven, I have found that such a driving is not essential where the shears are mounted in the general manner illustrated in Figure 1, since the necessary rotation thereof is imparted by the longitudinal travel of the material being sheared.

For cooling the shears during their operation, there may be provided water nozzles 41 for delivering jets of cooling water to the shears. In this manner the shears may be kept within any desired temperature range.

I have further found that while it is possible to effectively cool the shears in the manner referred to, the water does not prevent slivers or other small parts of metal from sticking to the shear blades. In order to obviate this difficulty, I preferably provide each of the shears with lubricating means in the form of a small oil reservoir 42 by means of which oil may be constantly delivered to the desired portions of the shears.

In some cases it is desirable to provide an apparatus which, in place of the variable adjustment for the shearing table, is provided with adjusting means such that provision is made for a more or less predetermined adjustment by increments. Such an apparatus is illustrated diagrammatically in Figure 8 as comprising a pedestal 43 carrying a sub-table 44 on which is mounted a shearing table 45. The shearing table is shown as bolted to the sub-table by means of bolts 46 extending through shims 47. Each of these shims is of such thickness that the removal of one shim will accommodate the apparatus to the next larger size pipe. For example, the shims may be each one inch in thickness so that the apparatus may be used with 20, 22, 24, 26 inch pipe and the like. Other shim thicknesses may be utilized, however, and the number of shims may be varied so that the desired results in this respect are obtained.

In Figures 9, 10 and 11 there is illustrated a slightly modified form of shear which has been found desirable for some purposes. The shear 48, which is of generally annular construction, as is the case with the shears previously described, is illustrated as having recessed or tapered sides 49. I have found that such recessing or shaping of the shears affords better clearance between the same and the material and prevents rubbing between the top surface of the shear and the pipe. Without some special construction of this character, I have found that the shears due to their rubbing action tend to more or less mar the surface of the pipe adjacent the burr which is being removed. Such marring action is increased in case of nicking of the cutting edges or of the adherence of metal particles thereto. In Figure 11 the shear is shown as having a main body portion of suitable material with cutting edges or corners 50 of special alloy whereby the length of life of the shear is increased.

This shear is shown as carried by a shear arbor 51 of hollow construction providing an oil reservoir 52. This reservoir is automatically effective for lubricating a bearing 53, the escape of lubricant from the bearing and the ingress of foreign particles being prevented by a special joint 54 between the shear arbor and the arbor base 55. The top of the reservoir may be closed by a suitable cover plate 56 removable at will to permit filling of the reservoir with lubricant. By reference more particularly to Figure 10 of the drawings, it will be apparent that the ball bearing is of large diameter, and that the cutting edge of the shear substantially coincides with the center line of the ball race. This has been found to afford an extremely rigid construction and one which satisfactorily prevents any tendency toward tipping of the shear.

In Figure 12 there is shown a further modification of the invention, the showing being largely diagrammatic for the purpose of illustrating the suitability thereof for use in the removal of a top burr in case the pipe is being formed with a top seam instead of a bottom seam. In this figure parts corresponding to parts previously described in connection more particularly with Figures 1 to 4 of the drawings are designated by the same reference characters having a prime affixed thereto. In this modified embodiment the set screws 24' are illustrated as passing through slotted openings 57 in the pivoted shear carriers 23', the set screws being threaded into the shear table 8'. In this manner the shear carriers are held in their desired elevated position and prevented from freely dropping downwardly about their pivotal mountings 22'. In addition to the set screws 24' by means of which such a controlling action is obtained, there may be provided supplemental set screws 58 effective for locking the carriers against movement in the opposite direction. It is also necessary in case of an inverted shear of this character to provide means for holding the shears 27' from dropping from the disks 29'. The desired results in this respect may be obtained by providing each of the shears with a recess 59 and providing a cap plate 60 carried by the disk 29' and working in such recess. In other respects the construction and operation of the shear correspond to that already described.

Rotary shears in addition to possessing the many advantages referred to, possess the further advantage that they lend themselves to a sharpening operation during rotation without removal from the apparatus. For effecting such a sharpening operation a tool of the required type may be held against the shears while the shearing operation is being performed.

My invention possesses the advantages of effecting complete or partial burr removal from a welded article regardless of the temperature of the article itself, and for giving to any remaining burr the desired configuration.

While I have herein illustrated and described a preferred embodiment of my invention and a method of carrying out the same, it will be understood that changes in the construction and operation may be made without departing either from the spirit of my invention or the scope of my broader claims.

I claim:

1. A shearing mechanism, comprising a pair of rotary shears effective on opposite sides of a predetermined center line and disposed in longitudinally offset relationship in substantially the same horizontal plane.

2. A shearing mechanism, comprising a pair of rotary shears effective on opposite sides of a predetermined center line and disposed in longitudinally offset relationship in substantially the same horizontal plane, and means for angularly adjusting one of said shears about an axis substantially parallel to said center line.

3. Apparatus for removing a burr from a welded article comprising a plurality of rotary shears, means for causing relative movement between the shears and the article, the shears being offset along the line of said movement, and disposed substantially in the same plane on opposite sides of the burr.

4. Apparatus for removing a burr from a welded article comprising a plurality of rotary shears, means for causing relative movement between the shears and the article, the shears being offset along the line of said movement and disposed substantially in the same plane on opposite sides of the burr, and means for adjusting the relative angular positions of said shears.

5. Apparatus for effecting the removal of burrs from articles having a substantially cylindrical surface, comprising a shear rotatable with its shearing edge in a plane angularly disposed to the plane containing the longitudinal axes of the article and burr and effective for deflecting the sheared burr laterally from the article as sheared, and means for rotatably supporting the shear.

6. Apparatus for effecting the removal of burrs from articles having a substantially cylindrical surface, comprising a plurality of shears each rotatable with its shearing edge in a plane angularly disposed to the plane containing the longitudinal axes of the article and burr and each effective for deflecting the sheared burr laterally from the article as sheared, said shears being longitudinally offset along the burr to be sheared, and means for rotatably supporting said shears.

7. Apparatus for effecting the removal of burrs from articles having a substantially cylindrical surface, comprising a plurality of longitudinally offset shears each rotatable with its shearing edge in a plane substantially tangent to said surface and effective from opposite sides of the burr to be sheared, and means for rotatably supporting the shears.

8. In a method of continuously severing a weld burr from a welded seam between edge portions of a plate formed and welded into a tube, the steps including continuously presenting a fresh shearing edge to the burr at an angle thereto and substantially along a plane at a slight angle to the plane joining the surfaces of the edge portions to separate the burr from the tube along said first-mentioned plane, and continuously diverting the severed burr laterally of the seam.

9. Apparatus for shearing the burr from a longitudinal welded seam in a pipe length, comprising means for feeding the length axially with the burr in a predetermined position, a disc shear substantially tangent to the pipe length and rotatable in a plane at an angle to that including the burr and the axis of the length.

10. Apparatus for shearing the burr from a longitudinal welded seam in a pipe length, comprising means for feeding the length axially with the burr in a predetermined position, a disc shear having a cutting edge for removing the burr, said disc shear being rotatable about an axis at an angle to the path of movement of the pipe length, and the cutting edge thereof lying in a plane intersecting the pipe length.

11. Apparatus for effecting the removal of burrs from welded articles, comprising guiding means for the welded articles effective for feeding the same with the burr in a predetermined position, and a plurality of cutting disks longitudinally offset and similarly mounted on opposite sides of the burr with their axes of rotation at a distance therefrom materially less than the radius of the disk so as to be successively effective for severing the burr against the inherent rigidity of the welded article and deflecting it laterally.

SIMON RICHARDS.